(12) United States Patent
Dhanuka et al.

(10) Patent No.: US 10,922,863 B2
(45) Date of Patent: Feb. 16, 2021

(54) SYSTEMS AND METHODS FOR EFFICIENTLY GENERATING AND MODIFYING AN OUTLINE OF ELECTRONIC TEXT

(71) Applicant: Adobe Inc., San Jose, CA (US)

(72) Inventors: Praveen Kumar Dhanuka, Howrah (IN); Harish Kumar, Uttar Pradesh (IN)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/014,683

(22) Filed: Jun. 21, 2018

(65) Prior Publication Data

US 2019/0392618 A1    Dec. 26, 2019

(51) Int. Cl.
| | | |
|---|---|---|
| *G06T 11/60* | (2006.01) | |
| *G06T 11/20* | (2006.01) | |
| *G06T 11/00* | (2006.01) | |
| *G06F 40/109* | (2020.01) | |

(52) U.S. Cl.
CPC .......... *G06T 11/60* (2013.01); *G06F 40/109* (2020.01); *G06T 11/001* (2013.01); *G06T 11/203* (2013.01); *G06T 2200/24* (2013.01)

(58) Field of Classification Search
CPC .... G06F 17/214; G06T 11/001; G06T 11/203; G06T 11/60
See application file for complete search history.

(56) References Cited

U.S. PATENT DOCUMENTS

| | | | | |
|---|---|---|---|---|
| 5,050,228 A | * | 9/1991 | Yoshida | G06K 15/00 345/660 |
| 5,155,805 A | * | 10/1992 | Kaasila | G06T 11/203 345/469 |
| 6,501,475 B1 | * | 12/2002 | Cheng | G06T 11/203 345/467 |
| 8,330,760 B1 | * | 12/2012 | Arnold | G06T 11/203 345/467 |
| 9,146,907 B1 | * | 9/2015 | Joshi | G06F 17/214 |
| 9,620,086 B1 | * | 4/2017 | Joshi | G09G 5/28 |
| 2002/0156816 A1 | * | 10/2002 | Kantrowitz | G06F 40/253 715/256 |
| 2004/0046769 A1 | * | 3/2004 | Arvin | G06T 11/60 345/619 |

(Continued)

FOREIGN PATENT DOCUMENTS

WO    WO-2013097817 A1 *  7/2013    ........... G06T 11/203

*Primary Examiner* — Sarah Lhymn
(74) *Attorney, Agent, or Firm* — Kilpatrick Townsend & Stockton LLP

(57) ABSTRACT

Certain embodiments involve efficiently generating and/or modifying an outline of electronic text. For example, a system obtains data indicating a glyph identifier associated with a first glyph of a plurality of glyphs displayed via a graphical user interface. The system retrieves a first outline of the first glyph from a cache using the glyph identifier and determines a transformation matrix associated with the first outline of the first glyph. The system generates first base art data for the first glyph, the first base art data including the first outline of the first glyph and the transformation matrix. The system converts the first glyph into the first outline based at least in part on the first base art data and then displays the first outline via the graphical user interface.

20 Claims, 8 Drawing Sheets

(56) References Cited

U.S. PATENT DOCUMENTS

| | | | | |
|---|---|---|---|---|
| 2006/0017733 | A1* | 1/2006 | Matskewich | G09G 5/246 345/467 |
| 2006/0020889 | A1* | 1/2006 | Coppinger | G06Q 10/109 715/710 |
| 2007/0139413 | A1* | 6/2007 | Stamm | G06T 11/203 345/467 |
| 2008/0303825 | A1* | 12/2008 | Clegg | G09G 5/28 345/471 |
| 2011/0188761 | A1* | 8/2011 | Boutros | G06K 9/68 382/218 |
| 2014/0136966 | A1* | 5/2014 | Ma | G06T 11/203 715/256 |
| 2015/0348297 | A1* | 12/2015 | Kaasila | G06T 1/20 345/467 |
| 2018/0247386 | A1* | 8/2018 | Zheng | G06T 1/0021 |

* cited by examiner

SYSTEMS AND METHODS FOR EFFICIENTLY GENERATING AND MODIFYING AN OUTLINE OF ELECTRONIC TEXT

TECHNICAL FIELD

This disclosure generally relates to glyph or text modification tools and more specifically to tools for efficiently generating and/or modifying an outline of electronic text.

BACKGROUND

In some instances, typography design tools can be used to modify the appearance of various glyphs (e.g., characters or text) in various typefaces. For instance, a typography design tool displays a glyph, such as a "b" character, in a graphical user interface. The typography design tool can generate an outline of the glyph and modify the geometry or one or more visual attributes of the glyph's design in response to one or more user inputs received via the graphical user interface. As an example, the user input can indicate a modification of a width of certain component of the character (e.g., the width of a stem in the "b" character), the curvature of certain component shapes of the character (e.g., the curvature of a bowl in the "b" character), etc.

However, current typography design tools are limited. For instance, some typography design tools may require converting each individual glyph displayed in a graphical user interface into an outline of the glyph, which can be computationally expensive and inefficient with regard to memory usage and the usage of processing resources. Moreover, as explained above, some typography design tools require manual input to modify each glyph displayed in a graphical user interface or each glyph in a text object (e.g., each glyph in a particular word). For instance, the user may be required to manually adjust each glyph in the word "typography." As another example, the user may be required to copy and paste each modified glyph to replace similar glyphs and then modify the pasted glyph to account for differences in size, placement, layout, etc. As still another example, a user can manually modify the letter "o" in the word "tomorrow" and current typography design tools may not modify other instances of the letter "o" in the word accordingly or may not account for variations in size, placement, layout, etc. of the other instances of the letter "o," which may require the user to manually modify each instance of the letter. Manually modifying glyphs may be time consuming, require expertise, inaccurate, or lead to the user changing the glyph so drastically as to render the glyph unrecognizable to an average reader.

Therefore, some existing systems and methods for designing and modifying typography present disadvantages such as, but not limited to, those discussed above. For these and other reasons, improved typography design systems and methods are therefore desirable.

SUMMARY

Various embodiments of the present disclosure provide systems and methods for efficiently generating and/or modifying an outline of electronic text.

In one example, a method includes: obtaining, by a processor, data indicating a glyph identifier associated with a first glyph of a plurality of glyphs displayed via a graphical user interface; retrieving, by the processor and using the glyph identifier, a first outline of the first glyph from a cache; determining, by the processor, a transformation matrix associated with the first outline of the first glyph; generating, by the processor, first base art data for the first glyph, the first base art data comprising the first outline of the first glyph and the transformation matrix; converting, by the processor, the first glyph into the first outline based at least in part on the first base art data; and displaying, by the processor, the first outline, via the graphical user interface.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

Figure 1:
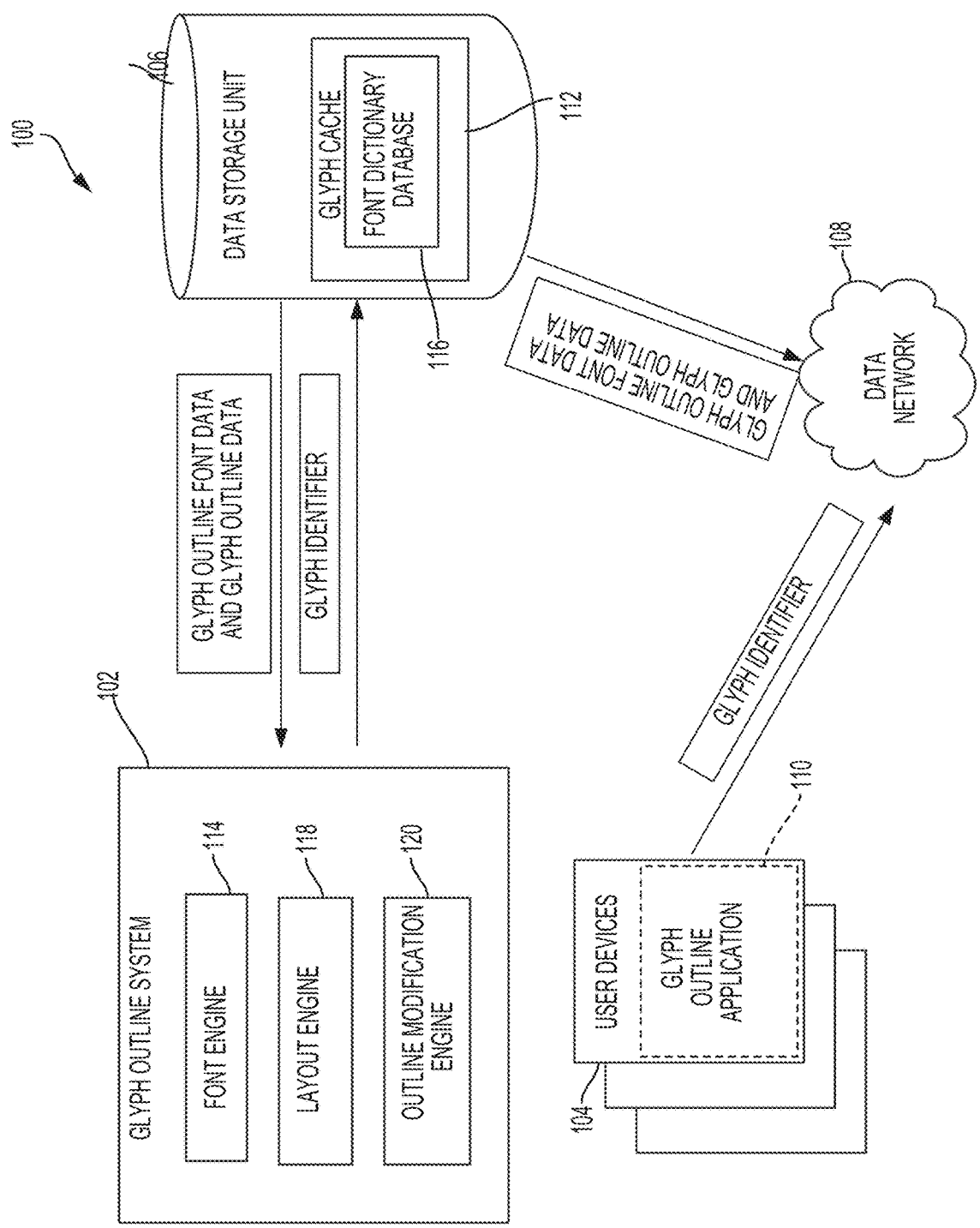
FIG. 1 is a block diagram of an exemplary environment in which a glyph outline system efficiently generates or modifies an outline of electronic text in accordance with one or more embodiments.

Various aspects and features of the present disclosure relate to efficiently generating and/or modifying an outline of electronic text (e.g., a glyph). Embodiments of the present disclosure involve efficiently generating and/or modifying an outline of a glyph by: i) efficiently retrieving an outline of a glyph from a cache to convert the glyph into the outline; ii) efficiently structuring or storing an output of the conversion process; and iii) automatically modifying an outline of a glyph in response to user input modifying an outline of another instance of the glyph. For example, the word "tomorrow" can include various glyphs (e.g., letters). Accordingly, a glyph outline system can convert each glyph "t," "o," "m," "r," "w" into an outline using a cached (e.g., stored) outline of each unique glyph, modify each outline to account for variations in sizes and layouts of the actual glyphs, as compared to the cached outline. The glyph outline system can then generate a base art of the various unique glyphs, rather than a base art of each individual glyph, and the base art can store format data used to output or display the various outlines of the various glyphs (e.g., the base art includes data indicating a color, outline, modification to the outline, etc. for the glyph). In this example, the glyph outline system can receive user input indicating a selection and modification of an outline of a particular glyph and the glyph outline system can update the corresponding base art of the glyph, identify other instances of the glyph, and automatically propagate the modification of the outline to other instances of the glyph based on the update to the base art.

As an example, the word "tomorrow" can include various glyphs and the word can be displayed via a graphical user interface. A glyph outline system can analyze the word and identify one or more of the glyphs in the word. To efficiently retrieve an outline of the one or more glyphs, two operations are performed. First, the glyphs are converted to their respective outlines based on a cached outline for the glyphs. Second, the outlines are transformed to account for variations in sizes and layouts as compared to the cached outline. For instance, the glyph outline system can access a cache that includes data indicating a glyph identifier associated with each unique glyph in the word "tomorrow" and data indicating a corresponding outline of the glyph. As an example, the cache includes a glyph identifier associated with the glyph "t," "o," "m," "r," and "w" and a corresponding outline for each glyph. In this example, each instance of the glyph "o" can be in the same font and have the same glyph identifier and each instance of the glyph "r" can be in the same font and have the same glyph identifier. The glyph outline can system can retrieve the data about the various outlines of the various glyphs in the word "tomorrow," convert the letters into their respective outlines, and output the outlines via the graphical user interface.

To transform the outlines, the glyph outline system can also analyze the glyphs to determine a transformation matrix to apply to a retrieved outline of a glyph (e.g., one or more scaling or translation operations to perform on a retrieved outline of a glyph). In some instances, this operation may be necessary because the size of the glyph is different from the cached sized of the outline for the glyph. As an example, the glyph outline system retrieves data about the outline of one or more instances of the glyph "o" from the cache. The glyph outline system can then determine a font size associated with the outline (e.g., a font size mapped to the outline in the cache) and compare the font size associated with the outline to the actual font size of the one or more instances of the glyph "o." In this example, if the font size of an instance of the glyph "o" is different from the font size associated with the outline in the cache, the glyph outline system can modify the retrieved outline based on the difference in font size. As an example, the glyph outline system determines that the outline information for the glyph "o" stored in the cache is associated with a font size of 14 and the first instance of the glyph "o" in the word "tomorrow" has a font size of 28. In this example, the glyph outline system can retrieve the outline information and scale or adjust the outline for the first instance of the glyph "o" based on the difference in font size (e.g., by doubling a size of the outline of the first instance of the glyph).

In some examples, the glyph outline system efficiently structure or store an output of the conversion process by creating and storing (e.g., in the cache) data indicating a base art of a glyph. Data indicating a base art of a glyph can include data about an outline of the glyph, a transformation matrix associated with the outline of the glyph, a color of the glyph, or any other information about the glyph or outline of the glyph. In this example, the glyph outline system can efficiently create and store base art data about each unique glyph. For instance, for the word "tomorrow," the glyph outline system can create base art information for each unique glyph (i.e. "t," "o," "m," "r," and "w") and store the base art information, which can be used to convert the glyph into its respective outline. In contrast, some existing methods and systems may require storing base art information for each individual glyph (i.e. "t," "o," "m," "m," "o," "r," "r," "o," "w."), which can be computationally expensive and inefficient with regard to memory usage and usage of processing resources.

In some examples, the glyph outline system can automatically modify an outline of a glyph by automatically modifying the determined or stored base art information or other information about the glyph. In this example, the glyph outline system can receive user input indicating a modification to the outline of the first instance of the glyph "o" (e.g., user input modifying a width of the letter) and the glyph outline system can modify the outline of the first instance of the glyph "o" in response to receiving the user input. In this example, the glyph outline system can automatically modify the base art information associated with the first instance of the glyph "o" to include data about the modification to the outline. Continuing with this example, the glyph outline system can output a request to the user to indicate whether the modification to the first instance of the glyph "o" should be applied to the other instances of the glyph and, in response to receiving user input indicating that the modification should be applied to the other instances, the glyph outline system can automatically modify the base art of each instance of the glyph "o" and/or the outline of each instance of the letter to correspond to the base art and/or outline of the first instance of the letter "o".

In this manner, the glyph outline system can efficiently fetch or retrieve data about glyphs by retrieving data about the outline of a glyph using the glyph identifier associated with the glyph. For instance, the word "tomorrow" includes five unique glyphs (i.e. "t," "o," "m," "r," and "w") and the glyph outline system can use the glyph identifier associated with the letter "o" to retrieve data about the outline or structure information for the letter "o" once and convert each instance of the letter into an outline using the retrieved data. Similarly, the glyph outline system can use the glyph identifier associated with the letter "r" to retrieve data about the outline or structure information for the letter "r" once and convert each instance of the letter into an outline using the retrieved data. In contrast, some existing methods and systems may require determining or retrieving outline or structure information for each glyph (e.g., each instance of the letter "o," and "r"), which can be computationally expensive and inefficient with regard to memory usage and the usage of processing resources. The glyph outline system can also efficiently store data about a glyph (e.g., base art data) and automatically modify one or more similar glyphs as described above.

In this manner, the glyph outline system described herein can efficiently generate or modify an outline of electronic text (e.g., a glyph).

Embodiments of the present disclosure provide advantages over previous solutions. For example, systems and methods described herein provide the ability to automatically and efficiently generate or modify an outline of a glyph, which can obviate the need for human intervention in generating or modifying an outline of glyph. As another example, systems and methods described herein provide the ability to automatically and efficiently generate or modify an outline of a glyph using a glyph identifier associated with each unique glyph, which can provide the ability to generate or modify glyph in a manner that is computationally inexpensive and efficient with regard to memory usage and usage of processing resources.

As used herein, the term "graphical glyph object" is used to refer to any glyph (e.g., character or text) that can be displayed via a graphical user interface.

As used herein, the term "glyph" is used to refer to any graphical glyph object as described above.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 100 in which a glyph outline system 102 efficiently generates or modifies an outline of electronic text in accordance with one or more embodiments. Electronic text can include one or more graphical glyph objects, which can be one or more graphical objects that represent a character and can be displayed via a graphical user interface. As an example, a graphical glyph object can be a graphical representation of the letter "t," the word "tomorrow," or any other character. The environment 100 includes the glyph outline system 102, one or more user devices 104, and one or more data storage units 106 (e.g., a cache or database). The glyph outline system 102, user devices 104, and the data storage unit 106 are communicatively coupled via one or more data networks 108 (e.g., the Internet, one or more local area networks ("LAN"), one or more wired area networks, or some combination thereof).

In some embodiments, a user of the user device 104 visits a webpage or an application store to explore applications supported by the glyph outline system 102. The glyph outline system 102 provides the applications as a software as service ("SaaS"), or as a standalone application that may be installed on the user device 104, or as a combination.

In some embodiments, the user device 104 represents various types of devices. For example, the user device 104 is a mobile device (e.g., a mobile telephone, a smartphone, a PDA, a tablet, a laptop, a watch, a wearable device, etc.). The user device 104, however, in some embodiments, is a non-mobile device (e.g., a desktop computer or another type of client device). In this example, the glyph outline system 102 can be implemented on, executed by, or stored on one or more user devices 104 or other computing device. For example, the glyph outline system 102 is stored on a memory device of the user device 104. In some embodiments, the glyph outline system 102 is executed on the one or more user devices 104 via a glyph outline application 110.

The data storage unit 106 includes a glyph cache 112 (e.g., a stacked memory space) that includes data about one or more graphical glyph objects such as, for example, data indicating a unique glyph identifier associated with a graphical glyph object in a particular font and data indicating a corresponding outline or structure of the graphical glyph object and a font dictionary database 116 associated with the graphical glyph object. In some instances, a font dictionary database 116 associated with a graphical glyph object can include data about the font of the outline of the graphical glyph object (e.g., a type of the font, size of the font, etc.).

As an example, the glyph cache 112 can include data indicating various glyph identifiers associated with various letters of the alphabet in a particular font and each glyph identifier can be mapped to data indicating information about the font of an outline of the letter (e.g., a type of the font, a size of the font, etc.) and the outline or structure of the letter. In some embodiments, data about the outline or structure of a graphical glyph object stored in the glyph cache 112 can include base outline information about the graphical glyph object. In some embodiments, base outline information about a graphical glyph object can include data indicating an origin or reference point of the graphical glyph object (e.g., an origin of transformation of the graphical glyph object) and/or a font size of an outline of the graphical glyph object. In some examples, the reference point or font size of the graphical glyph object can be a fixed or predetermined value. As an illustrative example, base outline information for a letter "t" an include data indicating an origin of transformation for the letter with respect to a point on an axis (e.g., 0,0), a pen position or advance width of the letter, a left bearing position of the letter, a right bearing position of the letter, a font size or type of an outline of the letter, or any other information about the letter.

The data stored in the glyph cache 112 can be obtained from the user device 104, via user input (e.g., if a user programs the data storage unit 106 to include the data), or any other source. In some examples, the glyph outline system 102 or the user device 104 can be communicatively coupled to the data storage unit 106 and the glyph outline system 102 or the user device 104 receives or obtains data stored in the glyph cache 112 from the data storage unit 106 via the data network 108 or a direct connection. In another embodiment, the glyph outline system 102 or the user device 104 includes the data storage unit 106 and can access the glyph cache 112.

In some embodiments, the glyph outline system 102 can include one or more instructions stored on a computer-readable storage medium and executable by one or more processors of a device. When executed by the one or more processors, the computer-executable instructions of the glyph outline system 102 cause the glyph outline system 102 to efficiently generate or modify an outline of electronic text.

In some embodiments, the glyph outline system 102 includes a font engine 114, a layout engine 118, and an outline modification engine 120, which can each be executed on the glyph outline system 102 or other computing device (e.g., user device 104 or any other computing device). For example, the engines 114, 118, 120 each include one or more instructions stored on a computer-readable storage medium and executable by a processor of a computing device. When executed by the one or more processors, the computer-executable instructions of the glyph outline system (e.g., the instructions of the engines 114, 118, 120) cause the glyph outline system 102 to efficiently generate or modify an outline of electronic text.

For example, the glyph outline system 102 generates a graphical user interface via which electronic text can be provided to a user. As an example, the glyph outline system 102 generates a graphical user interface via which one or more graphical glyph objects can be provided to the user. For instance, the glyph outline system 102 generates a graphical user interface via which various graphical glyph objects (e.g., letters) of the word "tomorrow" are provided to the user.

In some embodiments, the font engine 114 analyzes the graphical glyph objects and identifies or determines one or more of the graphical glyph objects. For instance, the font engine 114 can analyze the word "tomorrow" and identify one or more graphical glyph objects in the word (e.g., identify one or more letters in the word). In some embodiments, the font engine 114 can cause the glyph outline system 102 to determine a glyph identifier associated with one or more of the graphical glyph objects (e.g., based on user input indicating a glyph identifier associated with a graphical glyph object).

In some embodiments, the font engine 114 can cause the glyph outline system 102 to obtain (e.g., receive) data about one or more of the graphical glyph objects from the glyph cache 112. The data can include, for example, data indicating a glyph identifier associated with a graphical glyph object, data indicating a corresponding outline or structure of the graphical glyph object, base outline information about the graphical glyph object, or data indicating a font dictionary associated with the graphical glyph object. In some instances, a font dictionary associated with a graphical glyph object can include data about a particular font of an outline of the graphical glyph object.

As an example, the font engine 114 can obtain data from the glyph cache 112 that indicates a glyph identifier associated with one or more letters in the word "tomorrow," information about the font of the outline of the letter (e.g., a type of the font, a size of the font, etc.), and the outline or structure of the letter. In this example, each instance of the letter "o" can be in the same font and have the same glyph identifier and each instance of the letter "r" can be in the same font and have the same glyph identifier. In some embodiments, the font engine 114 can obtain the data from the glyph cache 112 once for each instance of the letter "o" or each instance of the letter "r" by using the glyph identifier associated with the letter "o" or letter "r" as described above. In some embodiments, the font engine 114 can obtain data indicating an outline or structure of one or more graphical glyph objects (e.g., one or more letters in the word "tomorrow") and cause the glyph outline system 102 to convert the various graphical glyph objects into their respective outlines and display (e.g., output) the outlines via a graphical user interface.

In this manner, the glyph outline system 102 can efficiently fetch or generate an outline of one or more graphical glyph objects by retrieving data about the outline or structure of the graphical glyph object using a glyph identifier associated with each unique graphical glyph object. For instance, since each instance of the letter "o" in the same font has the same glyph identifier, the glyph outline system 102 can retrieve the outline data for the letter "o" once and apply the same outline data to each instance of the letter to convert each instance of the letter into an outline. In contrast, some existing methods and systems may require determining or retrieving outline or structure information for each individual graphical glyph object (e.g., each instance of the letter "o"), which can be computationally expensive and inefficient with regard to memory and processing resource usage.

In some embodiments, the layout engine 118 can cause the glyph outline system 102 to analyze graphical glyph objects and determine a layout of one or more of the graphical glyph objects. For example, the glyph outline system 102 can analyze a graphical glyph object and determine a pen position, kerning, baseline, etc. of the graphical glyph object. In some examples, the glyph outline system 102 can determine a transformation matrix associated with a retrieved outline of a graphical glyph object (e.g., one or more scaling or translation operations to perform on a retrieved outline of a graphical glyph object) based on a determined layout of the graphical glyph object. In some embodiments, a transformation matrix associated with an outline of graphical glyph object includes data that can be used to modify or adjust the outline.

In some embodiments, performing a scaling operation on an outline of a graphic glyph objects can include performing any suitable scaling method, operation, or technique including, but not limited to, scaling (e.g., adjusting) a horizontal or vertical dimension of the outline or any other parameter or characteristic of the outline. In another embodiment, preforming a translation operation on an outline of a graphical glyph object can include performing any suitable translation method, operation, or technique including, but not limited to, modifying or adjusting a position of the outline (e.g., adjusting the position of the outline with respect to a reference point or with respect to a position of the graphic glyph object).

For instance, the glyph outline system 102 analyzes a graphical glyph object of the word "tomorrow" and retrieves information about the outline of the letters of the word from the glyph cache 112 in substantially the same manner as described above. The layout engine 118 can cause the glyph outline system 102 to determine a font size or layout (e.g., position) of one or more of the letters and perform one or more scaling or translation operations on the outline of the letter based on the determined font size or layout.

As an example, the layout engine 118 can cause the glyph outline system 102 to retrieve information about the outline or structure of one or more instances of the graphical glyph object of the letter "o" from glyph cache 112. The glyph outline system 102 can then determine a font size associated with the outline (e.g., a font size mapped to the outline in the glyph cache 112) and the actual font size of the one or more instances of the letter "o." The glyph outline system 102 can then compare the font size associated with the outline to the actual font size of the one or more instances of the letter "o." In this example, if the font size of an instance of the letter "o" is different from the font size associated with the outline in the glyph cache 112, the glyph outline system 102 can modify the retrieved outline based on the difference in font size. As an example, the glyph outline system 102 determines that the outline information for the letter "o" stored in the glyph cache 112 is associated with a font size of 14 and the first instance of the letter "o" in the word "tomorrow" has a font size of 28. In this example, the glyph outline system 102 can retrieve the outline information and scale or adjust the outline for the first instance of the letter "o" based on the difference in font size (e.g., by doubling a size of the outline of the first instance of the letter).

In some examples, the glyph outline system 102 can create and store (e.g., in the data storage unit 106 or glyph cache 112) data indicating an outline of one or more of the graphical glyph objects, a transformation matrix associated with the outline of the graphical glyph object, a color of the graphical glyph object, or any other information about the graphical glyph object. In some instances, such data about a graphical glyph object can represent a base art of the graphical glyph object. In this example, the glyph outline system 102 can store data about each unique graphical glyph object and use the base art data to convert the glyph object into its respective outline. For instance, for the word "tomorrow," the glyph outline system 102 can create base art information for each unique graphical glyph object (i.e. "t," "o," "m," "r," and "w".) and store the base art information. In contrast, some existing methods and systems may require storing base art information for each individual graphical glyph object (i.e. "t," "o," "m," "m," "o," "r," "r," "o," "w."), which can be computationally expensive and inefficient with regard to memory usage. While in this example, the base art information of a graphical glyph object is described as including color information, the present disclosure is not limited to such configurations. Rather, in other embodiments, base art information of a graphical glyph object may not include color information.

In some embodiments, the outline modification engine 120 can cause the glyph outline system 102 to automatically modify determined or stored base art information or other information about a graphical glyph object. For instance, the glyph outline system 102 can create and store base information about an outline of the graphical glyph object of the letter "o" and convert the letter into an outline in substantially the same manner as described above. In this example, the glyph outline system 102 can receive user input indicating a modification to the outline of the first instance of the letter "o" (e.g., user input modifying a width of the letter) and the glyph outline system 102 can modify the outline of the first instance of the letter "o" in response to receiving the user input. In this example, the glyph outline system 102 can automatically modify the base art information associated with the first instance of the letter "o" to include data about the modification to the outline. Continuing with this example, the glyph outline system 102 can output a request to the user to indicate whether the modification to the first instance of the letter "o" should be applied to the outline of the other instances of the letter and, in response to receiving user input indicating that the modification should be applied to the other instances, the glyph outline system 102 can automatically modify the base art of each instance of the letter "o" and/or the outline of each instance of the letter to correspond to the base art and/or outline of the first instance of the letter "o." In some embodiments, if the glyph outline system 102 receives user input indicating that the modification should not be applied to the other instances of the letter "o," the glyph outline system 102 can modify the outline of only the first instance of the letter "o."

Although the exemplary environment 100 of FIG. 1 is depicted as having a certain number of components, in other embodiments, the exemplary environment 100 has any number of additional or alternative components. Further, while FIG. 1 illustrates a particular arrangement of the glyph outline system 102, user devices 104, and the data storage unit 106, various additional arrangements are possible. As an example, while FIG. 1 illustrates data storage unit 106 and the glyph outline system 102 as part of separate systems, in some embodiments, the data storage unit 106 and the glyph outline system 102 are part of a single system. As another example, while FIG. 1 illustrates the font engine 114, layout engine 118, and outline modification engine 120 as separate engines, in some embodiments, the font engine 114, layout engine 118, and outline modification engine 120 are part of a single engine.

Figure 2:
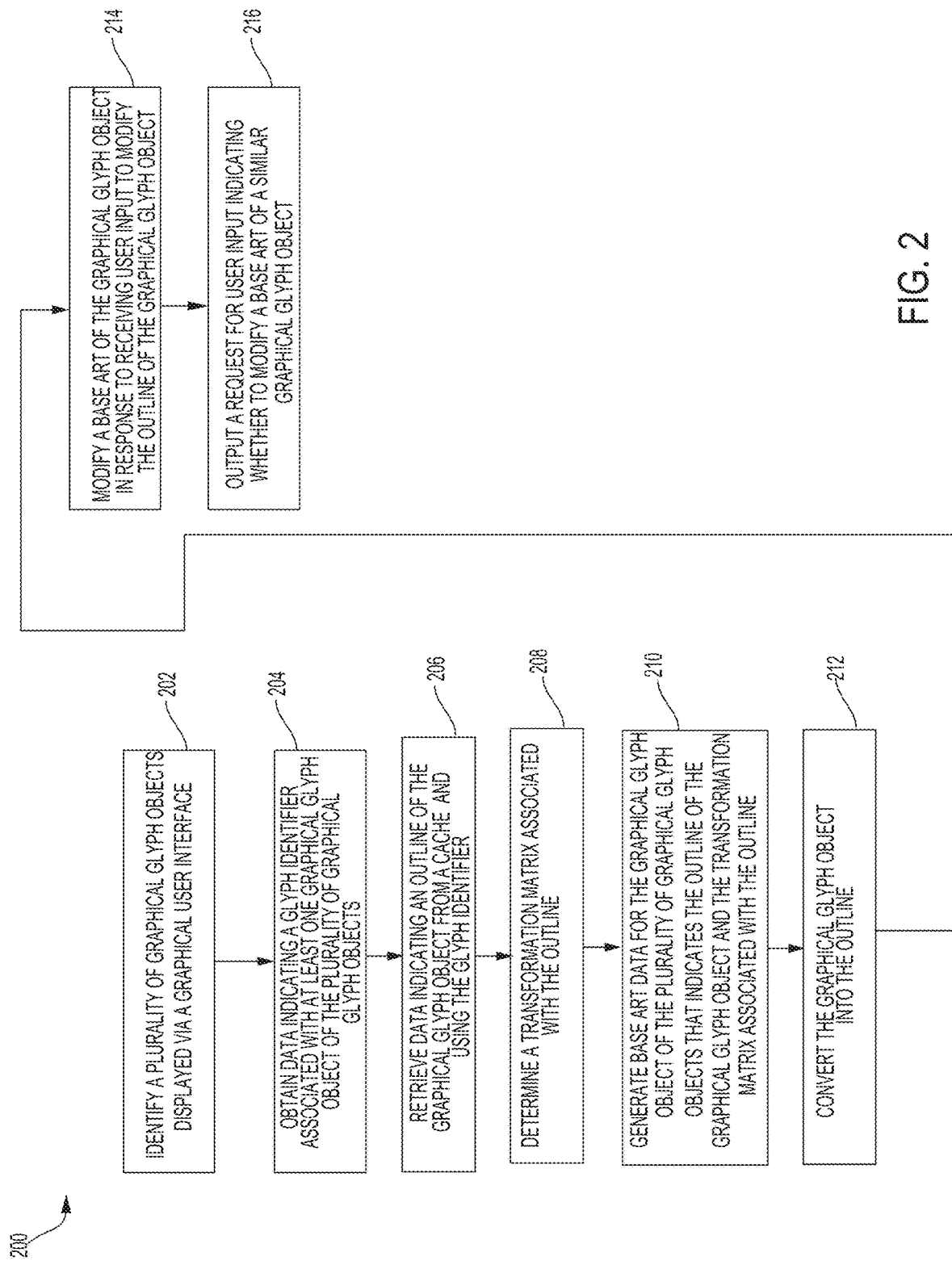
FIG. 2 is a flow chart depicting an example of a process for efficiently generating and/or modifying an outline of electronic text in accordance with one or more embodiments.

FIG. 2 is a flow chart depicting an example of a process 200 for efficiently generating and/or modifying an outline of electronic text in accordance with one or more embodiments. In some embodiments, one or more processing devices such as, for example, the computing system described herein with respect to FIG. 6, implement operations depicted in FIG. 2 by executing suitable program code (e.g., the glyph outline system 102 of FIG. 1) that implements one or more algorithms encompassed by the process 200. For illustrative purposes, the process 200 is described with reference to the examples depicted in FIG. 1, but other implementations are possible.

In block 202, a plurality of graphical glyph objects displayed via a graphical user interface are identified. In some embodiments, one or more processing devices execute a glyph outline system 102 to generate a graphical user interface via which one or more graphical glyph objects can be provided (e.g., displayed) to a user.

In some embodiments, a font engine 114 causes the glyph outline system 102 to analyze one or more of the graphical glyph objects to identify or determine the graphical glyph objects. For instance, the graphical glyph object can be a graphical glyph object of the word "tomorrow" and the font engine 114 can cause the glyph outline system 102 to analyze the word and identify one or more letters in the word.

In block 204, data indicating a glyph identifier associated with at least one graphical glyph object of the plurality of graphical glyph objects is obtained or determined. In some embodiments the font engine 114 causes the glyph outline system 102 to determine a glyph identifier associated with one or more of the graphical glyph objects. In another example, the font engine 114 causes the glyph outline system to obtain data (e.g., via user input, from the glyph cache 112, or any other source) indicating a glyph identifier associated with one or more of the graphical glyph objects.

Figure 3:
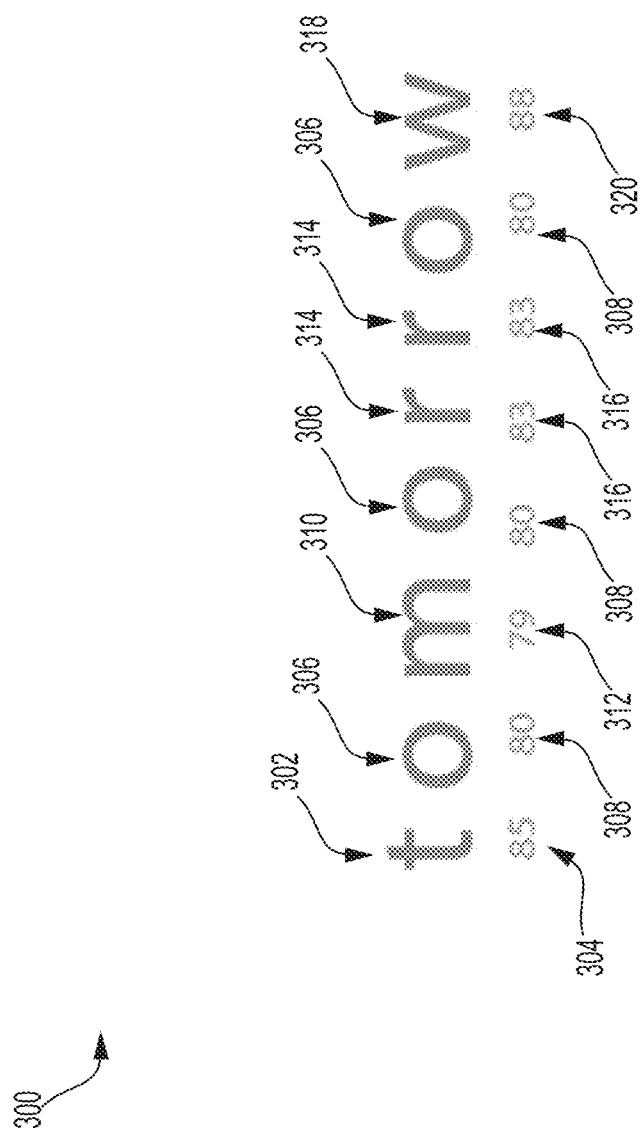
FIG. 3 is an image depicting various graphical glyph objects, along with corresponding glyph identifiers associated with the graphical glyph objects.

For example, FIG. 3 is an image 300 depicting showing various graphical glyph objects, along with corresponding glyph identifiers associated with the graphical glyph objects. In the example depicted in FIG. 3, the graphical glyph objects include the various letters of the word "tomorrow." In this example, the graphical letter "t" is associated with a glyph identifier of 85, the graphical letter "o" is associated with a glyph identifier of 80, the graphical letter "m" is associated with a glyph identifier of 70, the graphical letter "r" is associated with a glyph identifier of 83, and the graphical letter "w" is associated with a glyph identifier of 88. In some embodiments, the same graphical glyph object in the same font type is associated with the same glyph identifier. For instance, in the example depicted in FIG. 3, the graphic glyph object of the letter "o" is in the same font in each instance of the letter in the word "tomorrow" and each instance of the letter "o" is associated with the glyph identifier of 80. In some instances, a glyph identifier of a graphical glyph object may vary based on a font of the graphical glyph object. For instance, the graphical letter "t" in a first font type can have a first glyph identifier and the graphical letter in a second font type can have a second glyph identifier. While in this example, a glyph identifier is described as a value, the present disclosure is not limited to such configurations. Rather, in other embodiments, a glyph identifier can be any suitable identifier that can be associated with a graphical glyph object.

Returning to FIG. 2, in block 206, data indicating an outline of the graphical glyph object is retrieved from a cache and using the glyph identifier associated with the graphical glyph object. In some embodiments, one or more processing devices execute the font engine 114 to cause the glyph outline system 102 to obtain (e.g., receive or retrieve) data from a glyph cache 112. The data can include, for example, data indicating a glyph identifier associated with a graphical glyph object, data indicating a corresponding outline or structure of the graphical glyph object, base outline information about the graphical glyph object, or data indicating a font dictionary associated with the graphical glyph object. In some instances, a font dictionary associated with a graphical glyph object can include data about a font of the outline of the graphical glyph object (e.g., a type of the font, size of the font, etc.)

Figure 4:
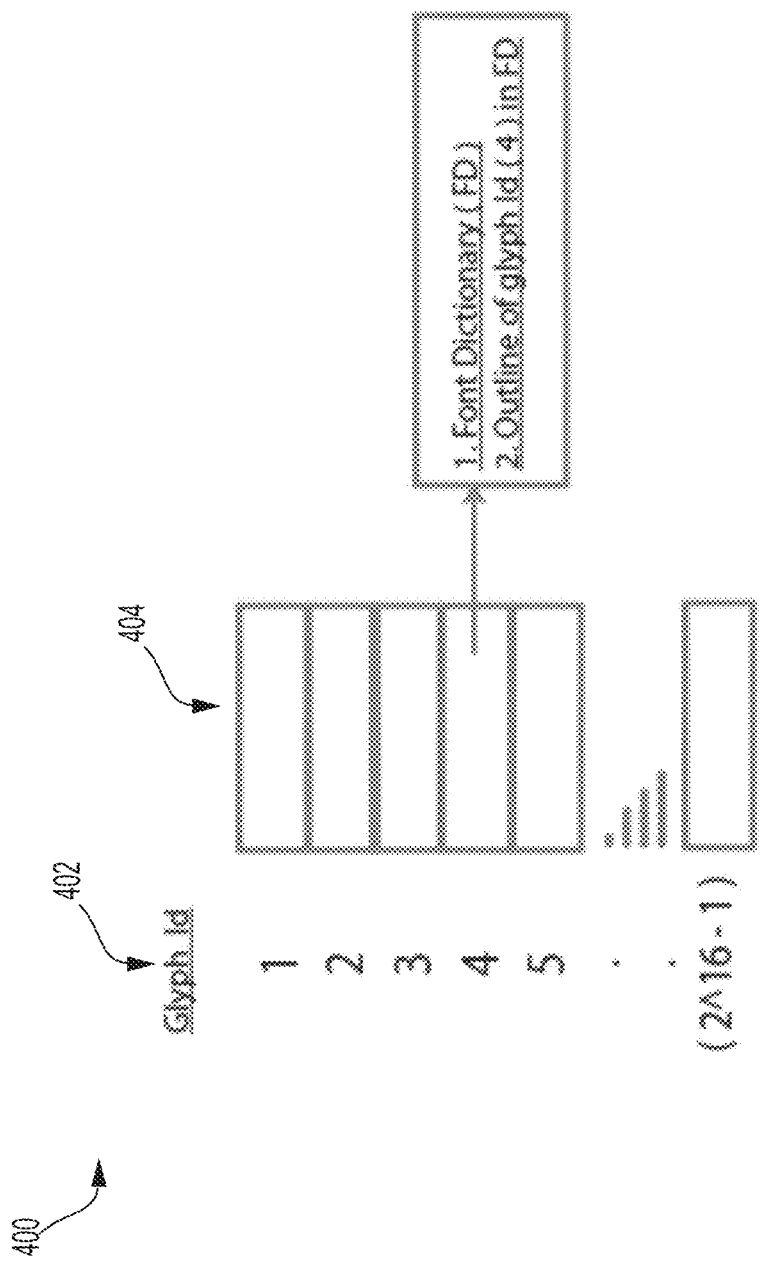
FIG. 4 is an image depicting an example of a glyph cache for efficiently generating and/or modifying an outline of electronic text according to some embodiments.

For example, FIG. 4 is an image depicting an example of a glyph cache 400 for efficiently generating and/or modifying an outline of electronic text according to some embodiments. In the example depicted in FIG. 4, the glyph cache 400 includes data indicating a glyph identifier of a graphical glyph object, along with data indicating a font dictionary database associated with the glyph identifier (e.g., the font dictionary database 116 of FIG. 1), and data indicating an outline or structure of the graphical glyph object associated with glyph identifier.

Returning to FIG. 2, and was an example, in block 206, the font engine 114 can cause the glyph outline system 102 to obtain data from the glyph cache 112 that indicates a glyph identifier associated with one or more letters in the word "tomorrow," information about the font of the outline of the letter (e.g., a type of the font, a size of the font, etc.), and an outline or structure of the letter. In this example, each instance of the letter "o" can be in the same font and have the same glyph identifier and each instance of the letter "r" can be in the same font and have the same glyph identifier. In some embodiments, the font engine 114 can cause the glyph outline system 102 to obtain the data from the glyph cache 112 once for each instance of the letter "o" or each instance of the letter "r" by using the glyph identifier associated with the letter "o" or letter "r" as described above.

In block 208, a transformation matrix for the retrieved outline is determined. In some embodiments, one or more processing devices execute the layout engine 118 to determine a transformation matrix for a retrieved outline.

For example, the layout engine 118 can cause the glyph outline system 102 to analyze graphical glyph objects and determine a layout of one or more of the graphical glyph objects. For example, the glyph outline system 102 can analyze a graphical glyph object and determine a pen position, kerning, baseline, etc. of the graphical glyph object. In some examples, the glyph outline system 102 can determine a transformation matrix associated with a retrieved outline of a graphical glyph object (e.g., one or more scaling or translation operations to perform on a retrieved outline of a graphical glyph object) based on a determined layout of the graphical glyph object. In some embodiments, performing a scaling operation on an outline of a graphic glyph objects can include performing any suitable scaling method, operation, or technique including, but not limited to, scaling (e.g., adjusting) a horizontal or vertical dimension of the outline or any other parameter or characteristic of the outline. In another embodiment, preforming a translation operation on an outline of a graphical glyph object can include performing any suitable translation method, operation, or technique including, but not limited to, modifying or adjusting a position of the outline (e.g., adjusting the position of the outline with respect to a reference point or with respect to a position of the graphic glyph object).

For instance, the glyph outline system 102 analyzes a graphical glyph object of the word "tomorrow" and retrieves information about the outline of the letters of the word from the glyph cache 112 in substantially the same manner as described above. The layout engine 118 can cause the glyph outline system 102 to determine a font size or layout (e.g., position) of one or more of the letters and perform one or more scaling or translation operations on the outline of the letter based on the determined font size or layout.

As an example, the layout engine 118 can cause the glyph outline system 102 to retrieve information about the outline or structure of one or more instances of the graphical glyph object of the letter "o" from glyph cache 112. The glyph outline system 102 can then determine a font size associated with the outline (e.g., a font size mapped to the outline in the glyph cache 112) and compare the font size associated with the outline to the actual font size of the one or more instances of the letter "o." In this example, if the font size of an instance of the letter "o" is different from the font size associated with the outline in the glyph cache 112, the glyph outline system 102 can modify the retrieved outline based on the difference in font size. As an example, the glyph outline system 102 determines that the outline information for the letter "o" stored in the glyph cache 112 is associated with a font size of 14 and the first instance of the letter "o" in the word "tomorrow" has a font size of 28. In this example, the glyph outline system 102 can retrieve the outline information and scale or adjust the outline information for the first instance of the letter "o" based on the difference in font size (e.g., by doubling a size of the outline of the first instance of the letter). In another embodiment, performing a scaling operation on a retrieved outline of a graphical glyph object can include performing any suitable scaling method or technique including, but not limited to, scaling a horizontal or vertical dimension of the outline or any other parameter or characteristic of the retrieved outline.

As another example, the layout engine 118 can cause the glyph outline system 102 to determine a position or layout of a first instance of the letter "o" (e.g., relative to a reference point) and retrieve data indicating an outline of the first instance of the letter "o" from the glyph cache 112 using the glyph identifier associated with the letter "o" as described above. In this example, the glyph cache 112 can including data indicating a particular position or layout of the outline (e.g., a position or layout of the outline relative to the reference point). In this example, the glyph outline system can compare the position or layout of the first instance of the letter "o" to the position or layout of the outline. Continuing with this example, the glyph outline system can translate or adjust the position or layout of the outline of the first instance of the letter "o" based on a difference between the position or layout of the first instance of the letter "o" and the position of the outline as indicated in the glyph cache 112 (e.g., based on a difference between the layout or position of the first instance of the letter "o" and the position of the outline relative to the reference point).

In some embodiments, a transformation matrix associated with an outline of a graphical glyph object can include data indicating one or more scaling or translating operations associated with the outline of the graphical glyph object.

In block 210, base art data for the graphical glyph object of the plurality of graphical glyph objects that indicates an outline of the graphical glyph object and a transformation matrix associated with the outline is created.

In some examples, the glyph outline system 102 can create and store (e.g., in the data storage unit 106 or glyph cache 112) data indicating an outline of one or more of the graphical glyph objects, a transformation matrix associated with the outline of the graphical glyph object, a color of the graphical glyph object, or any other information about the graphical glyph object or the outline of the graphical glyph object. In some instances, such data about an outline of a graphical glyph object can represent a base art of the graphical glyph object. In this example, the glyph outline system 102 can create the base art data based on data generated by executing the glyph outline system 102 and store the base art data. For instance, for the word "tomorrow," the glyph outline system 102 can generate base art data for each unique graphical glyph object (i.e. "t," "o," "m," "r," and "w") and store the base art information. Embodiments of the present disclosure provide advantages over previous solutions. For example, systems and methods described herein provide the ability to generate and store base art data for unique graphical glyph objects as described above, which can reduce the amount of memory or space required for storing base art data.

In block 212, a graphical glyph object is converted into an outline. For example, the glyph outline system 102 can retrieve data indicating an outline of a graphical glyph object (e.g., in block 206). The glyph outline system 102 can then covert the corresponding graphical glyph object into the outline. In some examples, the glyph outline system 102 can use base art data for the graphical glyph object (e.g., the base art data created in block 210) to convert the graphical glyph object into the outline.

For example, as described above, the font engine 114 can cause the glyph outline system 102 to obtain, from the glyph cache 112, data about an outline of a graphical glyph object such as, for example, the letter "o" or the letter "r" in the word "tomorrow," using a glyph identifier associated with the graphical glyph object. The glyph outline system 102 can then convert the graphical glyph object into its respective outline. In this manner, the glyph outline system 102 can efficiently fetch or retrieve data about graphical glyph objects by retrieving data about the outline or structure of the graphical glyph objects using a particular glyph identifier associated with a graphical glyph object.

Figure 5:
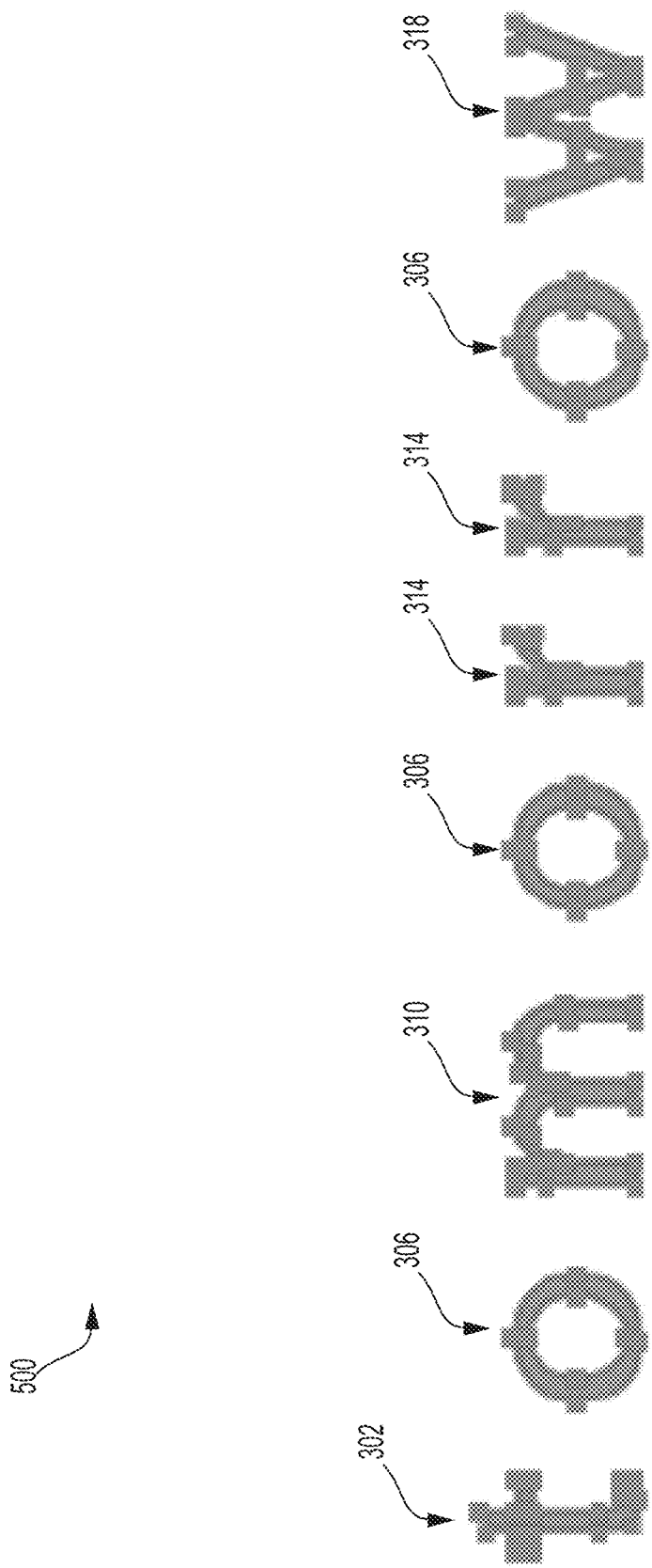
FIG. 5 is an image depicting the graphical glyph objects of FIG. 3 converted into outlines in accordance with one or more embodiments.

For example, FIG. 5 is an image depicting the graphical glyph objects of FIG. 3 converted into outlines in accordance with one or more embodiments.

Returning to FIG. 2, in block 214, a base art of the graphical glyph object is modified in response to receiving user input to modify the outline of the graphical glyph object. In some embodiments, the outline modification engine 120 can cause the glyph outline system 102 to automatically modify a determined or stored base art information or other information about a graphical glyph object.

For instance, the glyph outline system 102 can create and store base information about an outline of the graphical glyph object of the letter "o" and convert the letter into an outline in substantially the same manner as described above. In this example, the glyph outline system 102 can receive user input indicating a modification to the outline of the first instance of the letter "o" (e.g., user input modifying a width of the letter) and the glyph outline system 102 can modify the outline of the first instance of the letter "o" in response to receiving the user input. In this example, the glyph outline system 102 can automatically modify the base art information associated with the first instance of the letter "o" to include data about the modification to the outline.

In block 216, a request for user input indicating whether to modify a base art of a similar graphical glyph object is output. In some embodiments, the outline modification engine 120 can cause the glyph outline system 102 to output the request for user input indicating whether to modify the base art of a similar graphical glyph object.

For example, the glyph outline system 102 can modify base art information associated with a first instance of the letter "o" in the word "tomorrow" to include data about a modification to an outline of the first instance of the letter (e.g., in block 214). The glyph outline system 102 can then output a request to the user to indicate whether the modification to the first instance of the letter "o" should be applied to the outline of the other instances of the letter in the word "tomorrow" and, in response to receiving user input indicating that the modification should be applied to the other instances, the glyph outline system 102 can automatically modify the base art of each instance of the letter "o" and/or the outline of each instance of the letter to correspond to the base art and/or outline of the first instance of the letter "o."

In some embodiments, if the glyph outline system 102 receives user input indicating that the modification should not be applied to the other instances of the letter "o," the glyph outline system 102 can modify the outline of only the first instance of the letter "o."

Embodiments of the present disclosure provide advantages over previous solutions. For example, systems and methods described herein provide the ability to improve vector effect execution. For instance, some existing systems and methods may require that vector effect execution over any graphical glyph object involves obtaining an outline of the graphical glyph object and then applying, for each individual graphical glyph object, a particular effect (e.g., modification). However, such systems and methods can be computationally expensive and inefficient with regard to memory and processing resources usage. In contrast, embodiments of the present disclosure provide the ability to perform vector effect execution by obtaining a modified outline of a graphical glyph object, determining the base art information for each unique graphical glyph object as described above, and then, for each graphical glyph object, applying the base art for each unique graphical glyph object. For example, in the word "tomorrow," conventional systems and methods may require determining an outline for each individual letter and a modification effect to apply to each letter of the word and then modifying each individual letter accordingly (i.e. performing eight individual outline determination and modification operations). In contrast, embodiments described herein provide the ability to determine an outline for each unique graphical glyph object and perform outline medications based on each unique graphical glyph object (i.e. performing five outline determination and modification operations for the five unique letters in the word tomorrow).

Figure 6:
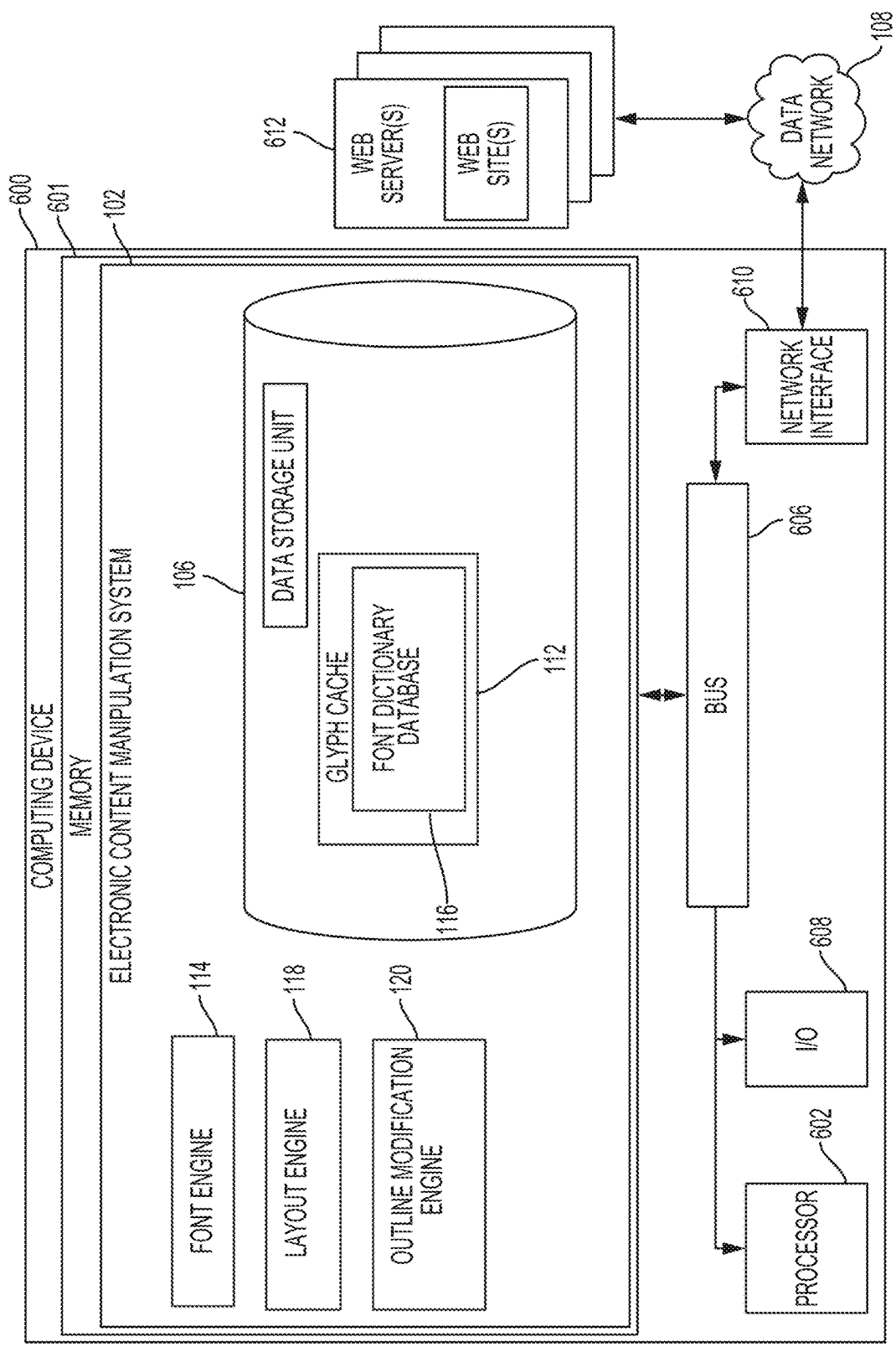
FIG. 6 is a block diagram of an exemplary glyph outline system that generates or modifies an outline of electronic text in accordance with one or more embodiments.
Figure 7:
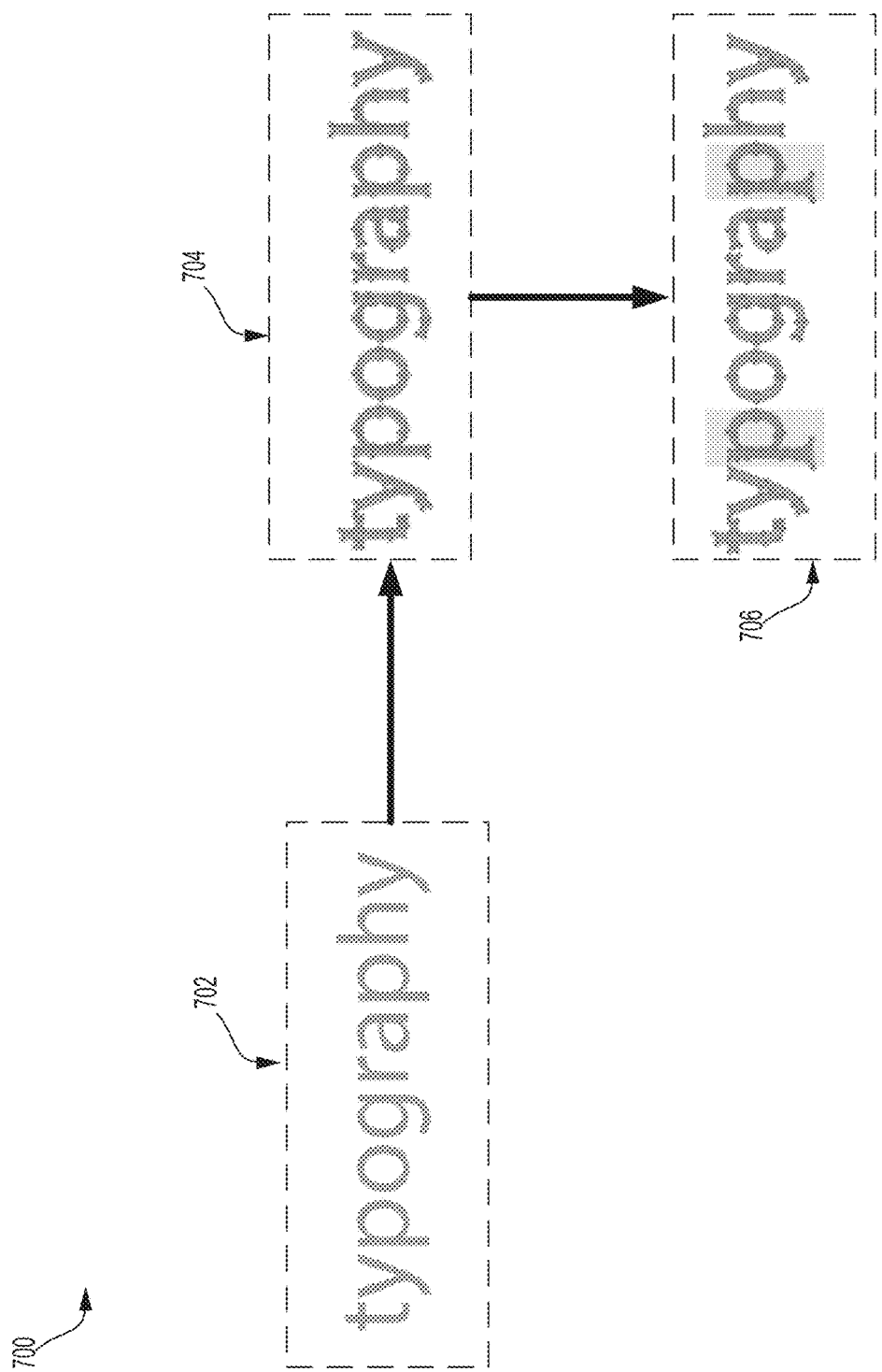
FIG. 7 is a flow chart of steps for efficiently generating and/or modifying an outline of electronic text in accordance with one or more embodiments.

FIG. 7 is a flow chart depicting an example of a process 700 for efficiently generating and/or modifying an outline of electronic text in accordance with one or more embodiments. In some embodiments, one or more processing devices such as, for example, the computing system described herein with respect to FIG. 6, implement operations depicted in FIG. 7 by executing suitable program code (e.g., the glyph outline system 102 of FIG. 1) that implements one or more algorithms encompassed by the process 700. For illustrative purposes, the process 700 is described with reference to the examples depicted in FIG. 1, but other implementations are possible.

In block 702, a processing device executes a glyph outline system 102 to generate a graphical user interface via which a plurality of graphical glyph objects such as, for the example, the letters of the word "typography," can be displayed and the processing device executes the glyph outline system 102 to identify each graphical glyph object.

In block 704, the processing device executes the glyph outline system 102 to convert each graphical glyph object into its respective outline by accessing a cache that includes data indicating data indicating a glyph identifier associated with each unique graphical glyph object in the word "typography" (i.e., "t," "y," "p," "o," "g," "r," "a," and "h") and data indicating a corresponding outline of each glyph. In some examples, in block 704, the glyph outline system 102 can transform one or more of the outlines to account for variations in sizes and layouts as compared to the cached outline.

In some examples, in block 704, the processing device executes the glyph outline system 102 to generate a base art of the various unique graphical glyph objects, rather than a base art of each individual graphical glyph object, and the base art can store data used to output or display the various outlines of the various graphical glyphs (e.g., the base art includes data indicating a color, outline, modification to the outline, etc. for the graphical glyph object).

Figure 8:
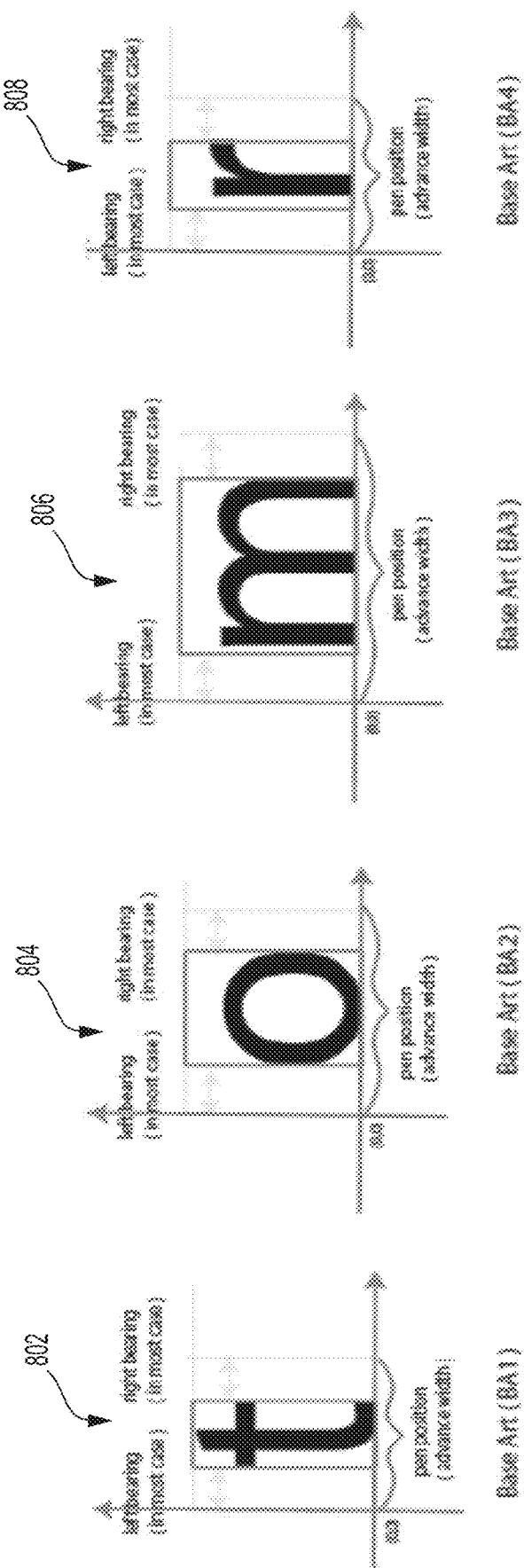
FIG. 8 is an image depicting an example of various base arts for various electronic text in accordance with one or more embodiments.

As an illustrative example, FIG. 8 is an image depicting an example of various base arts 802, 804, 806, 808 for various electronic text in accordance with one or more embodiments. In this example, the processing device can execute the glyph outline system 102 to generate a base art 802, 804, 806, 808 of each of four of the five unique graphical glyph objects in the word "tomorrow," (i.e. base art for the letters "t," "o," "m," and "r").

Returning to FIG. 7, in block 706, the glyph outline system 102 receives user input indicating a selection and modification of an outline of a particular graphical glyph object (i.e. the letter "p"). In response to receiving the user input, the glyph outline system 102 can update the corresponding base art of the particular graphical glyph object, identify other instances of the same graphical glyph object (i.e. the second instance of the letter "p"), and automatically propagate the modification of the outline to other instances of the graphical glyph object based on the update to the base art (e.g., by updating the base art data for each other instance of the graphical glyph object to account for the modification).

System Implementation Example

Any suitable computing system or group of computing systems can be used for performing the operations described herein. FIG. 6 is an example of a block diagram of a computing device 600 that executes a glyph outline system 102 to perform the operations described herein.

The depicted example of the computing device 600 includes one or more processors 602 communicatively coupled to one or more memory devices 601. The processor 602 executes computer-executable program code stored in the memory device 601, accesses information stored in the memory device 601, or both. Examples of the processor 602 include a microprocessor, an application-specific integrated circuit ("ASIC"), a field-programmable gate array ("FPGA"), or any other suitable processing device. The processor 602 can include any number of processing devices, including one or more processors 602 that are configured by program code to implement the operations described above, such as the operations depicted in FIGS. 1-2 that are described with respect to processing devices.

The memory device 601 includes any suitable non-transitory computer-readable medium for storing the glyph outline system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 601 are used to implement the operations described above, such as the operations depicted in FIGS. 1-2 that are described with respect to one or more non-transitory computer-readable media.

The computing device 600 may also include a number of external or internal devices such as input or output devices. For example, the computing device 600 is shown with an input/output ("I/O") interface 608 that can receive input from input devices or provide output to output devices. A bus 606 can also be included in the computing device 600. The bus 606 can communicatively couple one or more components of the computing device 600. In some embodiments, the bus 606 is used to implement the operations described above with respect to FIGS. 1-2 that involve communicating signals via a data bus.

The computing device 600 executes program code that configures the processor 602 to perform one or more of the operations described above with respect to FIGS. 1-2. The program code includes, for example, the glyph outline system 102, the glyph outline application 110, or other suitable applications that perform one or more operations described herein. The program code may be resident in the memory device 601 or any suitable computer-readable medium and may be executed by the processor 602 or any other suitable processor. In some embodiments, the program code described above is stored in the memory device 601, as depicted in FIG. 6. In additional or alternative embodiments, the program code described above is stored in one or more memory devices accessible via a data network.

The computing device 600 accesses the glyph cache 112 in any suitable manner. In some embodiments, the glyph cache 112 is stored in one or more memory devices accessible via a data network 108. In additional or alternative embodiments, some or all of the glyph cache 112 is stored in the memory device 601.

The computing device 600 depicted in FIG. 6 also includes at least one network interface 610. The network interface 610 includes any device or group of devices suitable for establishing a wired or wireless data connection to one or more data networks 108. Non-limiting examples of the network interface 610 include an Ethernet network adapter, a modem, and/or the like. The computing device 600 is able to communicate with one or more servers via the network interface 610. In some embodiments, the network interface 610 is used to implement the operations described above with respect to FIGS. 1-2 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising, by a processor:
   identifying one or more instances of each of a plurality of unique graphical glyph objects displayed via a graphical user interface, wherein the instances of a particular unique graphical glyph object include a first instance of the particular unique graphical glyph object and a second instance of the particular unique graphical glyph object;
   obtaining data indicating a glyph identifier associated with the particular unique graphical glyph object;
   retrieving, from a cache, an outline associated with the glyph identifier, the outline corresponding to the particular unique graphical glyph object and having fixed dimensions and an origin position relative to a reference point, the outline comprising at least a first value defining first shape information of a first region of the particular unique graphical glyph object and a second value defining second shape information of a second region of the particular unique graphical glyph object;
   determining a transformation matrix, the transformation matrix used to adjust the outline, wherein for each respective instance of the particular unique graphical glyph object, the transformation matrix transforms the outline such that the fixed dimensions are scaled to match dimensions of the respective instance of the particular unique graphical glyph object and the origin position is changed to match a respective position of the respective instance of the particular unique graphical glyph object on the graphical user interface;
   generating base art data associated with the particular unique graphical glyph object comprising the outline and the transformation matrix;
   converting, using the base art data associated with the particular unique graphical glyph object, the first instance of the particular unique graphical glyph object into the outline;
   receiving first user input indicating a selection and modification of the outline, the modification of the outline comprising at least changing the first value defining the first shape information of the first region of the particular unique graphical glyph object independently of the second value defining the second shape information of the second region; and
   in response to determining that the modification of the outline is to be applied to the second instance of the particular unique graphical glyph object, modifying the outline in the base art data and updating, based on the base art data, a display of the second instance of the particular unique graphical glyph object to correspond to the modified outline.

2. The method of claim 1,
   wherein determining that the modification of the outline is to be applied to the second instance of the particular graphical glyph object comprises receiving, by the processor, a second user input instructing to apply the modification of the outline to the second instance of the particular graphical glyph object.

3. The method of claim 1, wherein the cache comprises data indicating a plurality of glyph identifiers associated with the plurality of unique graphical glyph objects and the cache indicates a mapping, for each of the plurality of unique graphical glyph objects, between at least a respective glyph identifier, a respective outline, and respective font data associated with the respective outline.

4. The method of claim 1, wherein converting the first instance of the particular unique graphical glyph object into the outline comprises:
   determining, by the processor, a first font size associated with the outline of the particular unique graphical glyph object, the fixed dimensions of the outline defining the first font size;
   determining, by the processor, a second font size of the first instance of the particular unique graphical glyph object;
   comparing, by the processor, the first font size and the second font size to determine a difference between the first font size and the second font size; and
   configuring, by the processor, the first instance of the particular unique graphical glyph object to receive input to modify the outline based on the difference between the first font size and the second font size.

5. The method of claim 1, wherein:
   converting the first instance of the particular unique graphical glyph object into the outline comprises:
   determining, by the processor, a first position of the first instance of the particular unique graphical glyph object relative to the reference point;
   determining, by the processor, the origin position of the outline of the particular unique graphical glyph object relative to the reference point;
   comparing, by the processor, the first position and the origin position to determine a difference between the first position and the origin position; and configuring, by the processor, the first instance of the particular graphical glyph object to receive input to modify the outline based on the difference between the first position and the origin position.

6. The method of claim 1, wherein the base art data further comprises color data indicating a color of the particular unique graphical glyph object.

7. The method of claim 1, wherein the first shape information comprises a width or a curvature and wherein the first region comprises a stem or a bowl.

8. A system comprising:
a processing device; and
a non-transitory computer-readable medium communicatively coupled to the processing device, wherein the processing device is configured to perform operations comprising:
identifying one or more instances of each of a plurality of unique graphical glyph objects displayed via a graphical user interface, wherein the instances of a particular unique graphical glyph object include a first instance of the particular unique graphical glyph object and a second instance of the particular unique graphical glyph object;
obtaining data indicating a glyph identifier associated with the particular unique graphical glyph object;
retrieving, from a cache, an outline associated with the glyph identifier, the outline corresponding to the particular unique graphical glyph object and having fixed dimensions and an origin position relative to a reference point, the outline comprising at least a first value defining first shape information of a first region of the particular unique graphical glyph object and a second value defining second shape information of a second region of the particular unique graphical glyph object;
determining a transformation matrix, the transformation matrix used to adjust the outline, wherein for each respective instance of the particular unique graphical glyph object, the transformation matrix transforms the outline such that the fixed dimensions are scaled to match dimensions of the respective instance of the particular unique graphical glyph object and the origin position is changed to match a respective position of the respective instance of the particular unique graphical glyph object on the graphical user interface;
generating base art data associated with the particular unique graphical glyph object comprising the outline and the transformation matrix;
converting, using the base art data associated with the particular unique graphical glyph object, the first instance of the particular unique graphical glyph into the outline;
receiving first user input, indicating a selection and, modification of the outline, the modification of the outline comprising at least changing the first value defining the first shape information of the first region of the particular graphical glyph object independently of the second value defining the second shape information of the second region; and
in response to determining that the modification of the outline is to be applied to the second instance of the particular unique graphical glyph object, modifying the outline in the base art data associated with the first instance of the particular graphical glyph object and updating, based on the base art data, a display of the second instance of the particular unique graphical glyph object to correspond to the modified outline.

9. The system of claim 8, wherein determining that the modification of the outline is to be applied to the second instance of the particular unique graphical glyph object comprises receiving a second user input instructing to apply the modification to the outline to the second instance of the particular unique graphical glyph object.

10. The system of claim 8, wherein the cache comprises data indicating a plurality of glyph identifiers associated with the plurality of unique graphical glyph objects and the cache indicates a mapping, for each of the plurality of unique graphical glyph objects, between at least a respective glyph identifier, a respective outline, and respective font data associated with the respective outline.

11. The system of claim 8, wherein converting the first instance of the particular graphical glyph object into the outline comprises:
determining a first font size associated with the outline of the particular unique graphical glyph object, the fixed dimensions of the outline defining the first font size;
determining a second font size of the first instance of the particular unique graphical glyph object;
comparing the first font size and the second font size to determine a difference between the first font size and the second font size; and
configuring the first instance of the particular unique graphical glyph object to receive input to modify the outline based on the difference between the first font size and the second font size.

12. The system of claim 8, wherein converting the first instance of the particular unique graphical glyph object into the outline comprises:
determining a first position of the first instance of the particular unique graphical glyph object relative to the reference point;
determining the origin position of the outline of the particular unique graphical glyph object relative to the reference point;
comparing the first position and the origin position to determine a difference between the first position and the origin position; and
configuring the first instance of the particular unique graphical glyph object to receive input to modify the outline based on the difference between the first position and the origin position.

13. The system of claim 8, wherein the base art data further comprises color data indicating a color of the particular unique graphical glyph object.

14. A system comprising:
a means for identifying one or more instances of each of a plurality of unique graphical glyph objects displayed via a graphical user interface, wherein the instances of a particular unique graphical glyph object include a first instance of the particular unique graphical glyph object and a second instance of the particular unique graphical glyph object;
a means for obtaining data indicating a glyph identifier associated with the particular unique graphical glyph object;
a means for retrieving, from a cache, an outline associated with the glyph identifier, the outline corresponding to the particular unique graphical glyph object and having fixed dimensions and an origin position relative to a reference point, the outline comprising at least a first value defining first shape information of a first region of the particular unique graphical glyph object and a second value defining second shape information of a second region of the particular unique graphical glyph object;

a means for determining a transformation matrix, the transformation matrix used to adjust the outline, of wherein for each respective instance of the particular unique graphical glyph object, the transformation matrix transforms the outline such that the fixed dimensions are scaled to match dimensions of the respective instance of the particular unique graphical glyph object and the origin position is changed to match a respective position of the respective instance of the particular unique graphical glyph object on the graphical user interface;

a means for generating base art data associated with the particular unique graphical glyph object, the base art data comprising the outline and the transformation matrix;

a means for converting, using the base art data, the first instance of the particular graphical glyph object into the outline;

a means for receiving first user input for modification of the outline, the modification of the outline comprising at least changing the first value defining the first shape information of the first region of the particular graphical glyph object independently of the second value defining the second shape information of the second region; and a means for modifying, in response to determining that the modification of the outline is to be applied to the second instance of the particular unique graphical glyph object, the outline in the base art data and updating, based on the base art data, a display of the second instance of the particular unique graphical glyph object to correspond to the modified outline.

15. The system of claim 14, further comprising:

a means for outputting a request for a second user input instructing to apply the modification of the outline to the second instance of the particular unique graphical glyph object;

a means for receiving the second input.

16. The system of claim 14, wherein converting the first instance of the particular unique graphical glyph object into the outline comprises:

determining a first position of the first instance of the particular unique graphical glyph object relative to the reference point;

determining the origin position of the outline of the particular unique graphical glyph object relative to the reference point;

comparing the first position and the origin position to determine a difference between the first position and the origin position; and configuring the first instance of the particular unique graphical glyph object to receive input to modify the outline based on the difference between the first position and the Gccond origin position.

17. The system of claim 14, wherein converting the first instance of the particular unique graphical glyph object into the outline comprises:

determining a first font size associated with the outline of the particular unique graphical glyph object;

determining a second font size of the first instance of the particular unique graphical glyph object;

comparing the first font size and the second font size to determine a difference between the first font size and the second font size; and configuring the first instance of the particular unique graphical glyph object to receive input to modify the outline based on the difference between the first font size and the second font size.

18. The system of claim 14, wherein the cache comprises data indicating a plurality of glyph identifiers associated with the plurality of graphical glyph objects and the cache indicates a mapping, for each of the plurality of unique graphical glyph objects, between at least a respective glyph identifier, a respective outline, and respective font data associated with the respective outline.

19. The system of claim 14, wherein the base art data further comprises color data indicating a color of the particular unique graphical glyph object.

20. The system of claim 14, wherein determining that the modification of the outline is to be applied to the second instance of the particular unique graphical glyph object comprises receiving a second user input instructing to apply the modification of the outline to the second instance of the particular unique graphical glyph object.

\* \* \* \* \*